United States Patent
Davydov et al.

(10) Patent No.: US 10,050,692 B2
(45) Date of Patent: Aug. 14, 2018

(54) METHOD AND SYSTEM OF ADVANCED INTERFERENCE CANCELLATION ON PDSCH AT THE UE

(71) Applicant: Intel IP Corporation, Santa Clara, CA (US)

(72) Inventors: Alexei Davydov, Niz (RU); Seunghee Han, Cupertino, CA (US); Gregory Morozov, Niz (RU)

(73) Assignee: Intel IP Corporation, Santa Clara, CA (US)

( * ) Notice: Subject to any disclaimer, the term of this patent is extended or adjusted under 35 U.S.C. 154(b) by 161 days.

(21) Appl. No.: 14/903,575

(22) PCT Filed: Aug. 7, 2014

(86) PCT No.: PCT/US2014/050056
§ 371 (c)(1),
(2) Date: Jan. 7, 2016

(87) PCT Pub. No.: WO2015/021229
PCT Pub. Date: Feb. 12, 2015

(65) Prior Publication Data
US 2016/0173262 A1    Jun. 16, 2016

Related U.S. Application Data

(60) Provisional application No. 61/863,902, filed on Aug. 8, 2013.

(51) Int. Cl.
*H04L 5/00* (2006.01)
*H04B 7/06* (2006.01)
(Continued)

(52) U.S. Cl.
CPC ....... *H04B 7/0626* (2013.01); *E04G 23/0218* (2013.01); *E04H 9/025* (2013.01);
(Continued)

(58) Field of Classification Search
CPC . H04B 7/0626; H04B 7/0639; H04W 64/006; H04W 8/02; H04W 36/32;
(Continued)

(56) References Cited

U.S. PATENT DOCUMENTS

| 2011/0206170 A1 | 8/2011 | Wilborn et al. |
| 2012/0008574 A1* | 1/2012 | Xiao ............... H04L 1/0007 370/329 |

(Continued)

FOREIGN PATENT DOCUMENTS

| WO | 2010134778 A2 | 11/2010 |
| WO | 2013/066935 A1 | 5/2013 |
| WO | 2013067253 A1 | 5/2013 |

OTHER PUBLICATIONS

First Office Action dated Jul. 31, 2017 from Chinese Patent Application No. 201480038481.3, 12 pages.
(Continued)

*Primary Examiner* — Thai Nguyen
(74) *Attorney, Agent, or Firm* — Schwabe, Williamson & Wyatt, P.C.

(57) ABSTRACT

Methods and apparatuses for communicating in a wireless network include provision of interfering signal characteristics information including parameters used in a coding procedure used to encode at least one interfering signal to a user equipment to facilitate suppression of the at least one interfering signal present in a downlink signal being received at the user equipment.

20 Claims, 8 Drawing Sheets

(51) Int. Cl.
| | |
|---|---|
| H04W 76/14 | (2018.01) |
| H04W 4/70 | (2018.01) |
| H04L 5/14 | (2006.01) |
| H04W 56/00 | (2009.01) |
| H04W 4/00 | (2018.01) |
| H04W 52/02 | (2009.01) |
| H04W 36/08 | (2009.01) |
| H04W 72/08 | (2009.01) |
| H04W 76/02 | (2009.01) |
| H04W 36/28 | (2009.01) |
| H04W 24/10 | (2009.01) |
| H04L 1/18 | (2006.01) |
| E04G 23/02 | (2006.01) |
| E04H 9/02 | (2006.01) |
| H04W 16/26 | (2009.01) |
| H04W 24/02 | (2009.01) |
| H04W 48/16 | (2009.01) |
| H04W 8/02 | (2009.01) |
| H04W 36/32 | (2009.01) |
| H04W 64/00 | (2009.01) |
| H04W 72/04 | (2009.01) |
| H04W 4/02 | (2018.01) |
| H04W 36/14 | (2009.01) |
| H04L 27/26 | (2006.01) |
| H04W 88/08 | (2009.01) |
| H04W 48/12 | (2009.01) |
| H04W 74/08 | (2009.01) |
| H04W 88/04 | (2009.01) |

(52) U.S. Cl.
CPC ......... *H04B 7/0617* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 4/70* (2018.02); *H04W 8/02* (2013.01); *H04W 16/26* (2013.01); *H04W 24/02* (2013.01); *H04W 24/10* (2013.01); *H04W 36/08* (2013.01); *H04W 36/28* (2013.01); *H04W 36/32* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 64/006* (2013.01); *H04W 72/082* (2013.01); *H04W 76/023* (2013.01); *H04W 76/14* (2018.02); *H04L 5/0053* (2013.01); *H04L 5/1469* (2013.01); *H04L 27/2602* (2013.01); *H04W 4/023* (2013.01); *H04W 36/14* (2013.01); *H04W 48/12* (2013.01); *H04W 72/0406* (2013.01); *H04W 72/0446* (2013.01); *H04W 74/0833* (2013.01); *H04W 88/04* (2013.01); *H04W 88/08* (2013.01); *Y02B 60/50* (2013.01); *Y02D 70/00* (2018.01)

(58) Field of Classification Search
CPC . H04W 16/26; H04W 48/16; H04W 52/0219; H04W 24/02; E04H 9/025
See application file for complete search history.

(56) References Cited

U.S. PATENT DOCUMENTS

| | | | |
|---|---|---|---|
| 2012/0087396 A1* | 4/2012 | Nimbalker | H04L 1/1822 375/219 |
| 2012/0176884 A1* | 7/2012 | Zhang | H04B 7/024 370/203 |
| 2012/0201162 A1* | 8/2012 | Kim | H04B 17/345 370/252 |
| 2013/0115987 A1* | 5/2013 | Yoo | H04J 11/0056 455/501 |
| 2013/0115988 A1 | 5/2013 | Sun et al. | |
| 2013/0121168 A1 | 5/2013 | Luo et al. | |
| 2016/0013903 A1* | 1/2016 | Kim | H04J 11/005 370/329 |

OTHER PUBLICATIONS

3GPP, "Technical Specification Group Radio Access Network; Evolved Universal Terrestrial Radio Access (E-UTRA); Multiplexing and channel coding (Release 11)," 3GPP TS 36.212 V11.3.0 (Jun. 2013), Jun. 26, 2013, Lte Advanced, 84 pages.
International Search Report and Written Opinion for PCT/US2014/050056 dated Nov. 13, 2014; 11 pages.

\* cited by examiner

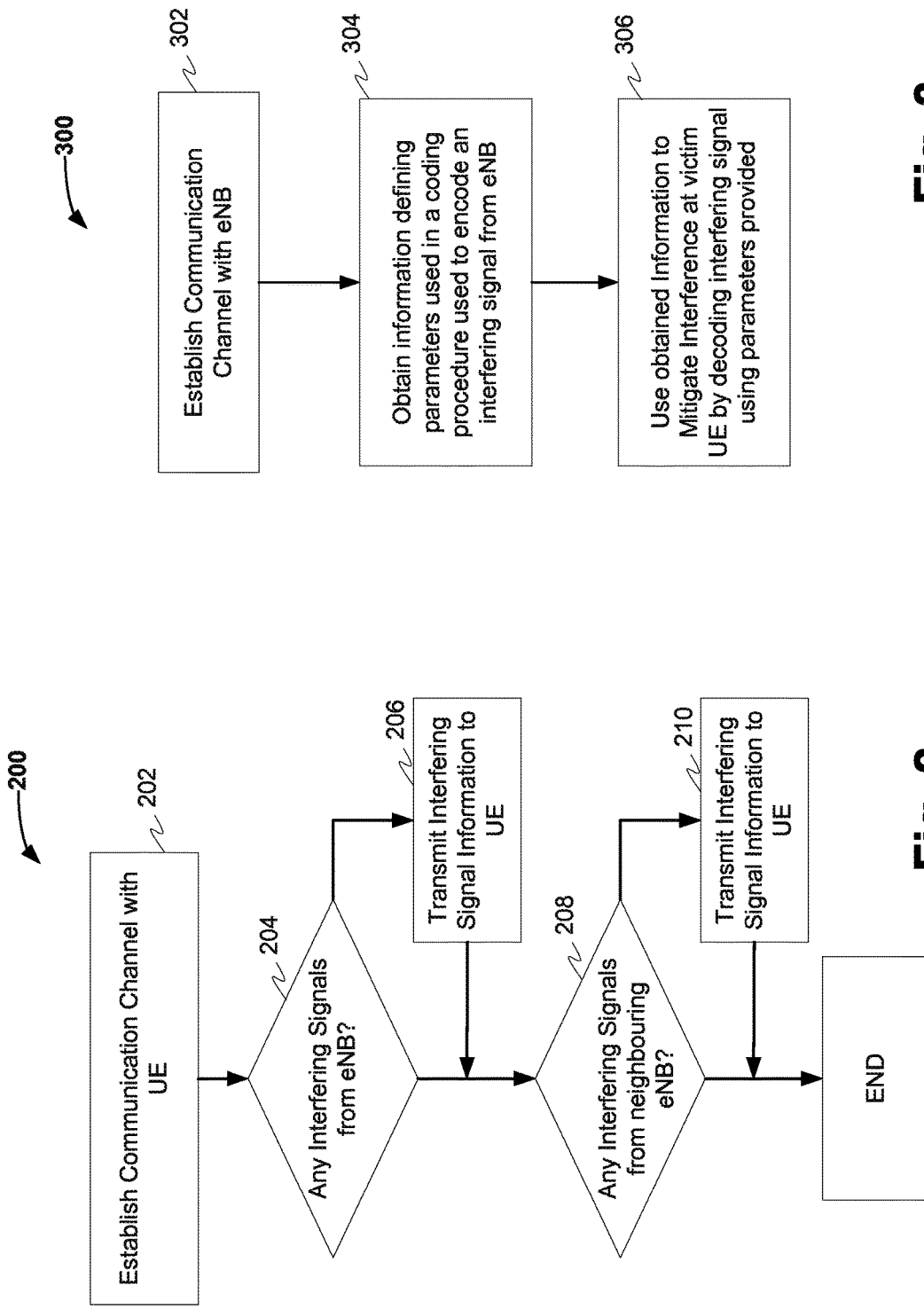

| One Codeword: Codeword 0 enabled, Codeword 1 disabled || Two Codewords: Codeword 0 enabled, Codeword 1 enabled ||
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Fig. 7

| One Codeword: Codeword 0 enabled, Codeword 1 disabled || Two Codewords: Codeword 0 enabled, Codeword 1 enabled ||
|---|---|---|---|
| Value | Message | Value | Message |
| 0 | 1 layer, port 11, $n_{SCID}=0$ | 0 | 2 layers, ports 11,13, $n_{SCID}=0$ |
| 1 | 1 layer, port 11, $n_{SCID}=1$ | 1 | 2 layers, ports 11,13, $n_{SCID}=1$ |
| 2 | 1 layer, port 13, $n_{SCID}=0$ | 2 | 3 layers, ports 7-9 |
| 3 | 1 layer, port 13, $n_{SCID}=1$ | 3 | 4 layers, ports 7-10 |
| 4 | 2 layers, ports 11,13 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Fig. 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9, $n_{SCID}=0$ | 0 | 2 layers, ports 9,10, $n_{SCID}=0$ |
| 1 | 1 layer, port 9, $n_{SCID}=1$ | 1 | 2 layers, ports 9,10, $n_{SCID}=1$ |
| 2 | 1 layer, port 10, $n_{SCID}=0$ | 2 | 3 layers, ports 7-9 |
| 3 | 1 layer, port10, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Fig. 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |
| 8 | 1 layer, port 9, $n_{SCID}=0$ | 8 | 2 layers, ports 9,10, $n_{SCID}=0$ |
| 9 | 1 layer, port 9, $n_{SCID}=1$ | 9 | 2 layers, ports 9,10, $n_{SCID}=1$ |
| 10 | 1 layer, port 10, $n_{SCID}=0$ | 10 | 3 layers, ports 7-9 |
| 11 | 1 layer, port10, $n_{SCID}=1$ | 11 | 4 layers, ports 7-10 |
| 12 | 2 layers, ports 7-8 | 12 | 5 layers, ports 7-11 |
| 13 | 3 layers, ports 7-9 | 13 | 6 layers, ports 7-12 |
| 14 | 4 layers, ports 7-10 | 14 | 7 layers, ports 7-13 |
| 15 | Reserved | 15 | 8 layers, ports 7-14 |

Fig. 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 1 layer, port 9, $n_{SCID}=0$ | 4 | 2 layers, ports 9,10, $n_{SCID}=0$ |
| 5 | 1 layer, port 9, $n_{SCID}=1$ | 5 | 2 layers, ports 9,10, $n_{SCID}=1$ |
| 6 | 1 layer, port 10, $n_{SCID}=0$ | 6 | 3 layers, ports 7-9 |
| 7 | 1 layer, port 10, $n_{SCID}=1$ | 7 | 4 layers, ports 7-10 |

Fig. 11

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID}=0$ | 0 | 2 layers, ports 11,13, $n_{SCID}=0$ |
| 1 | 1 layer, port 11, $n_{SCID}=1$ | 1 | 2 layers, ports 11,13, $n_{SCID}=1$ |
| 2 | 1 layer, port 13, $n_{SCID}=0$ | 2 | 3 layers, ports 11,13,12 |
| 3 | 1 layer, port 13, $n_{SCID}=1$ | 3 | 4 layers, ports 11,13,12,14 |
| 4 | 2 layers, ports 11,13 | 4 | 5 layers, ports 11,13,12,14,7 |
| 5 | 3 layers, ports 11,13,12 | 5 | 6 layers, ports 11,13,12,14,7,8 |
| 6 | 4 layers, ports 11,13,12,14 | 6 | 7 layers, ports 11,13,12,14,7,8,9 |
| 7 | Reserved | 7 | 8 layers, ports 7-14 |

Fig. 12

METHOD AND SYSTEM OF ADVANCED INTERFERENCE CANCELLATION ON PDSCH AT THE UE

CROSS REFERENCE TO RELATED APPLICATIONS

The present application is a national phase entry under 35 U.S.C. § 371 of International Application No. PCT/US2014/050056, filed Aug. 7, 2014, entitled "METHOD AND SYSTEM OF ADVANCED INTERFERENCE CANCELLATION ON PDSCH AT THE UE", which claims priority to U.S. Provisional Patent Application No. 61/863,902, filed Aug. 8, 2013, entitled "ADVANCED WIRELESS COMMUNICATION SYSTEMS AND TECHNIQUES," the entire disclosures of which are hereby incorporated by reference in their entireties.

TECHNICAL FIELD

Embodiments described herein generally relate to the field of wireless communications and, more particularly, to the provision of information to facilitate interference mitigation in a wireless network.

BACKGROUND OF THE INVENTION

It is becoming more important to be able to provide telecommunication services to fixed and mobile subscribers as efficiently and inexpensively as possible. Further, the increased use of mobile applications has resulted in much focus on developing wireless systems capable of delivering large amounts of data at high speed.

Development of more efficient and higher bandwidth wireless networks has become increasingly important and addressing issues of how to maximize efficiencies in such networks is ongoing. Many techniques for maximizing efficiencies in such networks involve increased reuse of frequency channels and therefore co-channel interference, either from inter-cell or co-scheduled intra-cell users, is becoming a significant limiting factor for achieving higher network capacity.

BRIEF DESCRIPTION OF THE DRAWING

Aspects, features and advantages of embodiments of the present invention will become apparent from the following description of embodiments in reference to the appended drawings in which like numerals denote like elements and in which:

FIG. 2 is a flow diagram showing an exemplary method in an evolved node base station according to various embodiments;

FIG. 3 is a flow diagram showing an exemplary method in a User Equipment according to various embodiments;

FIG. 7 is a legacy {Antenna port(s), scrambling identity and number of layers indication} mapping table according to various embodiments;

FIG. 8 is a first new {Antenna port(s), scrambling identity and number of layers indication} mapping table with UE-specific antenna ports 11, 13 used for PDSCH transmission with up to two layers according to various embodiments;

FIG. 9 is a second new {Antenna port(s), scrambling identity and number of layers indication} mapping table with UE-specific antenna ports 9, 10 used for PDSCH transmission with up to two layers according to various embodiments;

FIG. 10 is a third, alternative, combined, form of new {Antenna port(s), scrambling identity and number of layers indication} mapping table with 4 bit indexing according to various embodiments;

FIG. 11 is a second alternative combined form of new {Antenna port(s), scrambling identity and number of layers indication} mapping table with 3 bit indexing according to various embodiments;

FIG. 12 is a fourth new {Antenna port(s), scrambling identity and number of layers indication} mapping table with UE-specific antenna ports 11, 13, 9, 10 used for PDSCH transmission on the first four layers according to various embodiments;

DETAILED DESCRIPTION OF EMBODIMENTS

Illustrative embodiments of the present disclosure include, but are not limited to, methods, systems, and apparatuses for interference cancellation on a Physical Downlink Shared Channel (PDSCH) at the User Equipment (UE) in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "according to some embodiments" and "in . . . various embodiments" are used repeatedly. The phrases generally do not refer to the same embodiment; however, they may. The terms "comprising," "having," and "including" are synonymous, unless the context dictates otherwise. The phrase "NB" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
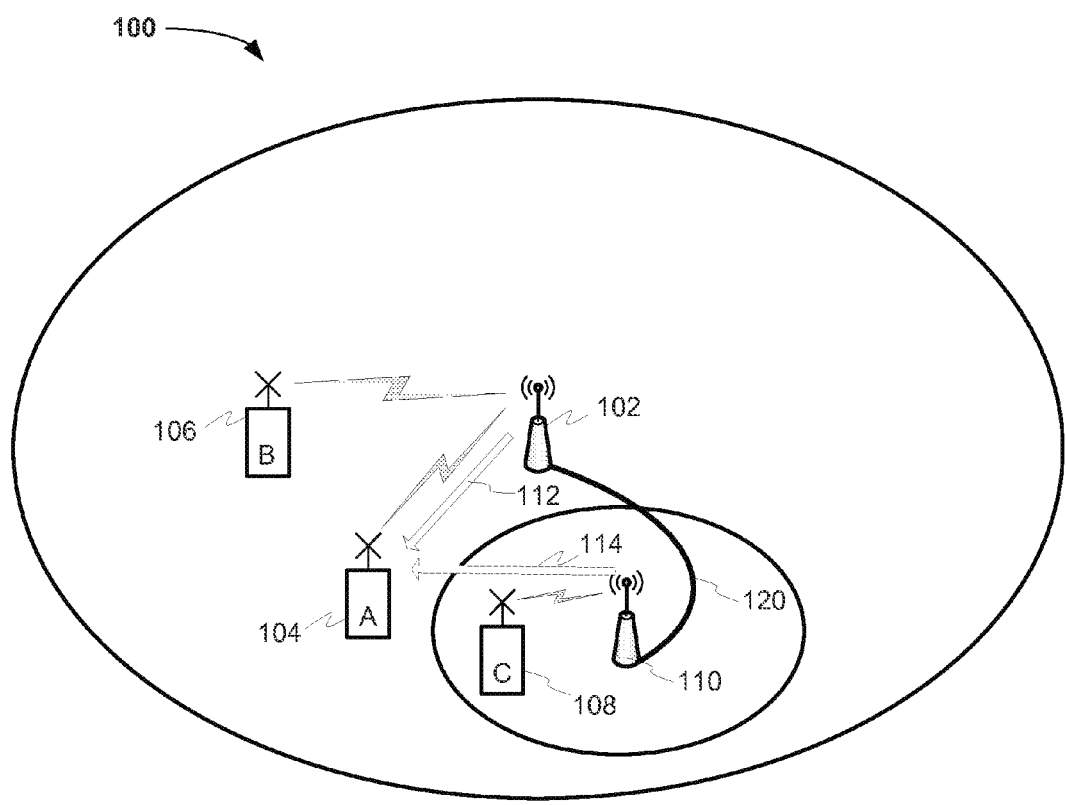
FIG. 1 is a block diagram of an example wireless network according to various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a first base station, e.g., evolved node base station (eNB) 102, configured to wirelessly communicate with one or more mobile device(s) or terminal(s), e.g., first user equipment (UE) A 104 and/or second UE B 106. In various embodiments, the eNB 102 may be a fixed station (e.g., a fixed node) or a mobile station/node.

Wireless communication network 100 further includes a second evolved node base station (eNB) 110 covering a cell area that overlaps with that of the first eNB 102, the second eNB 110 being configured to wirelessly communicate with one or more further mobile device(s) or terminal(s), e.g. third user equipment (UE) C 108, or indeed the same UEs (104 and 106) as the first eNB 102. Thus, wireless communication network 100 can be considered an example of a heterogeneous network that includes cells of different sizes, each of which may re-use radio resources within the network as appropriate, and there may be interference experienced in the form of either inter-cell interference or intra-cell interference, or both.

In various embodiments, the UE 104-108 and/or the eNB 102, 110 may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing. The UE 104-108 may provide some type of channel state information (CSI) feedback to the eNB 102,110 via one or more up link channels, and the eNB 102,110 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

The base station 102 may be configured to re-use frequency resources for communication to both the first UE 104 and the second UE 106, for example through use of multi-user multiple-in-multiple-out (MU-MIMO) techniques.

While embodiments are described with reference to an LTE network, some embodiments may be used with other types of wireless access networks.

The following inventive embodiments may be used in a variety of applications including transmitters and receivers of a radio system, although the present invention is not limited in this respect. Radio systems specifically included within the scope of the present disclosure include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

To improve the capacity of wireless communication networks, such as LTE-A networks, deployment of heterogeneous networks to achieve cell-splitting gains and MU-MIMO have been suggested. However, in both scenarios, co-channel interference, either from inter-cell or co-scheduled intra-cell users, is expected to become the dominant limiting factor for achieving higher network capacity. For example, while MU-MIMO makes use of beam steering to limit the received signal power at the first UE 104 of the signal transmitted to the second UE 106, the signal will still be present at the first UE at some level. If the first and second UE are utilizing the same frequency and time resources (i.e. wireless resources) then the signal transmitted to the second UE 106 may result in co-channel interference at the first UE 104, and thus the first UE 104 may now also be referred to as the victim UE, as it is a UE experiencing, i.e. a victim of, interference. Of course, interference can occur in the other direction, i.e. the signal transmitted to the first UE 104 may result in co-channel interference at the second UE 106, in which case the second UE 106 would be the victim UE. These are exemplary forms of intra-cell interference.

Similarly, while the third UE 108 is communicating with second base station 110, if the same wireless resources are used as for communications between the first UE 104 and the first eNB 102, the signal transmitted to the third UE 108 may cause inter-cell interference at the first UE 104, and vice versa (and with reference to the second UE 106 as well).

In conventional systems, such co-channel (intra-cell) or inter-cell interference is mitigated by using coordinated multi-point techniques (CoMP), which helps to avoid interference at the transmitting base station (i.e. on the network side). However, interference mitigation at the UE side, by accounting for spatial properties of the interference, can also provide promising gains in spectral efficiency. Interference mitigation may also be referred to herein as interference cancellation and/or suppression.

According to some embodiments, interference mitigation at the receiver side may be enhanced through the use of advanced interference cancellation algorithms at the receiver (e.g. of a UE) based on information provided to the UE relating to the interfering signal, for example the interfering signal structure. For example, receivers may be provided with side knowledge of the interfering signal, such as, but not limited to, the modulation format, the presence and characteristic of interference, its transmission schemes including allocation, its reference symbols, and its modulation and/or coding, which are not available at the UE side in a conventional wireless communication network. Information can be provided to the first UE 104, for example, using message 112 by the first eNB 102. Receivers using the herein described advanced interference cancellation algorithms may be used to provide performance improvements of the different physical channels, such as, but not limited to the Physical Downlink Shared Channel (PDSCH), Physical Downlink Control Channel (PDCCH), Enhanced Physical Downlink Control Channel (EPDCCH), and the like.

According to some embodiments, advanced receiver structures and corresponding signaling for PDSCH are provided.

According to some embodiments, the first UE 104 may receive and decode one or more messages 114 transmitted by the second base station 110 that provide information on an interfering signal being transmitted from the second base station 110 to the third UE 108. The first UE 104 may be provided with configuration data by the first base station 102 to allow the first UE 104 to identify relevant information within the messages 114 being transmitted by the second base station 110. In some embodiments, the first UE 104 may be informed about the parameters of the interfering signals directly from the interfering eNB 110 (e.g. over the air interface). In some other embodiments, the parameters of the interfering signals may be transmitted through, for example, a backhaul link between the eNBs (e.g. using an X2-AP interface 120 between the eNBs). Thus, the second base station 110 may transfer the parameters to the first base station 102, for onwards transmission to the first UE 104 for interference cancellation and suppression at the first UE 104.

Detailed embodiments described below provide a number of ways in which the additional information on the structure of the interference can be conveyed to the UE 104 to assist in interference mitigation at the UE.

Referring to FIG. 2 an exemplary method 200 performed at eNB 102 of the wireless network 100 in accordance with some embodiments is shown. First, a communication channel between the first UE 104 and the eNB 102 is established 202, for example using the normal UE registration procedure to attach to the network and request radio resources for communication. Once the eNB 102 has registered the presence of the first UE 104 and allocated frequency resources for communication with the first UE 104, the eNB may identify 204 any other ongoing communications, for example with second UE 106, using the same frequency resources and that may therefore cause interference at the first UE 104. If a potentially interfering signal being transmitted by the eNB 102 is identified, then information on the interfering signal is conveyed 206 to the first UE 104.

The eNB 102 may then further identify 208 signals transmitted by neighboring eNBs, such as eNB 110, that are using the same frequency resources. Again, if a potentially interfering signal is identified, for example the communications between the second eNB 110 and the third UE 108, then information on the respective interfering signal is conveyed 210 to the first UE 104.

According to some embodiments, the eNB 102 may only identify interfering signals transmitted by itself (i.e. blocks 204/206) or alternatively only interfering signals transmitted by neighboring eNBs (blocks 208/210). Information relating to interfering signals, or interfering signal characteristics information, may be provided as a separate message from the eNB 102 to the first UE 104 for each identified signal, or may be combined into a single communication for all identified interference sources. In some embodiments, the information relating to interfering signals may be provided as part of downlink control information (DCI), or as part of other, higher level signaling, such as medium access control (MAC) or Radio Resource Control (RRC) messages provided to the UE experiencing the respective interference, for example, first UE 104.

According to some embodiments, the interfering signal information provided by the first eNB 102 to the victim UE (e.g. first UE 104) may be in the form of parameters that identify control information being transmitted by the base station 102, or by a neighboring eNB 110 that contains parameters relating to the interfering signal and that should be monitored and decoded by the victim UE (e.g. first UE 104). For example, the base station 102 could provide information to enable the user equipment 104 to receive and decode downlink channel information (DCI) relating to other user equipment in the network.

FIG. 3 shows an exemplary method 300 performed at the victim UE (e.g. first UE 104) in the wireless network 100 according to various embodiments. The first UE 104 requests allocation 302 of frequency resources from the eNB 102, and receives information on allocated resources. The first UE 104 also obtains 304 from the eNB information defining parameters used in a coding procedure used to encode an interfering signal also received at the victim UE (e.g. first UE 104). These may be interfering signal(s) relating to other signals transmitted by the eNB 102 and/or neighboring eNBs. The obtained information defining parameters used in a coding procedure used to encode an interfering signal may include received interfering signal characteristics information, which may comprise, for example, the modulation format, the presence and characteristic of interference, its transmission schemes including allocation, its reference symbols, and its modulation and/or coding, of potentially interfering signals. The first UE 104 then uses 306 the obtained information defining parameters used in a coding procedure used to encode an interfering signal to mitigate interference by decoding the interfering signal(s) using the obtained information, and carrying out interference cancellation and/or suppression on the served signal, using said decoded interfering signal.

Different advanced receiver structures (such as maximum likelihood (ML), successive interference cancellation (SIC) (may also be referred to as a Linear-CodeWord level Interference Cancellation (L-CWIC) type receiver), maximum a posteriori probability (MAP) (may also be referred to as a Maximum Likelihood-CodeWord level Interference Cancellation (ML-CWIC) type receiver), and the like) may require different levels of signaling support. Thus, according to various embodiments, the different parameters that may be provided to different receiver-type structures to facilitate interference cancellation are disclosed. In some different embodiments, some other enhancements that can be used to improve operation of advanced interference cancellation/suppression receivers are also disclosed. The proposed signaling (and some advanced receiver structures) disclosed in some embodiments may facilitate operation of the advanced interference cancellation/suppression receivers.

According to different embodiments, codeword level interference cancellation (CWIC—i.e. L-CWIC and ML-CWIC) type receivers, for example SIC and MAP receivers may be used for the PDSCH. The operation principle of SIC (i.e. L-CWIC) and MAP (i.e. ML-CWIC) receivers may rely on the possibility of the demodulation and the decoding of the interfering layer(s) at a victim UE (i.e. a UE experiencing the interference), for the purpose of interference cancellation. The operation principle of SIC (i.e. L-CWIC) and MAP (i.e. ML-CWIC) receivers may also rely on the possibility of the re-encoding of the interfering layer(s) at the victim UE, for the purpose of interference cancellation. This is to say that interference suppression/cancellation may be improved by demodulating and decoding (and, potentially, re-encoding) any interfering signal, so that it may be suitably removed from the (main) signal intended to be received. A difference between successive interference cancellation (SIC) (e.g. L-CWIC) and maximum a posteriori probability (MAP) receivers (e.g. ML-CWIC) is that the output of a SIC (L-CWIC) receiver for the interfering layer(s) are hard bits, while the output of a MAP (ML-CWIC) receiver for the interfering layer(s) are soft metrics also indicating probability of the decoder decisions. Since the SIC (L-CWIC) and MAP (ML-CWIC) receiver processing may involve decoding of the interfering layer(s), according to embodiments, the victim UE receiver may be provided with information about assumptions that were used to generate the respective interfering signal (for example, the interfering signal caused by a signal designated for transmission to another UE in the neighboring cell).

According to embodiments, technical specification 36.212, section 5.1.4.1.2 of the LTE-A standard defines the procedure on how the coded sequence is derived at the eNB transmitter. In particular the soft buffer partition and circular buffer size NIR are determined as follows:

Denote the soft buffer size for the transport block by NIR bits and the soft buffer size for the r-th code block by Ncb bits. The size Ncb is obtained as follows, where C is the number of code blocks computed in section 5.1.2:

$$N_{cb} = \min\left(\left\lfloor \frac{N_{IR}}{C} \right\rfloor, K_w\right)$$

for DL-SCH and PCH transport channels
$N_{cb}=K_w$ for UL-SCH and MCH transport channels
where NIR is equal to:

$$N_{IR} = \left\lfloor \frac{N_{soft}}{K_C \cdot K_{MIMO} \cdot \min(M_{DL\_HARQ}, M_{limit})} \right\rfloor$$

where:
If the UE signals ue-Category-v10xy (e.g. called ue-Category-v1020 in latest standards documents), and is configured with transmission mode 9 or transmission mode 10 for the DL cell, Nsoft is the total number of soft channel bits [4] according to the UE category indicated by ue-Category-v10xy [6]. Otherwise, Nsoft is the total number of soft channel bits [4] according to the UE category indicated by ue-Category [6].

If $N_{soft}$=35982720,
$K_C$=5,
elseif $N_{soft}$=3654144 and the UE is capable of supporting no more than a maximum of two spatial layers for the DL cell,
$K_C$=2
else
$K_C$=1
End if.

$K_{MIMO}$ is equal to 2 if the UE is configured to receive PDSCH transmissions based on transmission modes 3, 4, 8, 9 or 10 as defined in section 7.1 of [3], and is equal to 1 otherwise.

If the UE is configured with more than one serving cell and if at least two serving cells have different UL/DL configurations, MDL_HARQ is the maximum number of DL HARQ processes as defined in Table 7-1 in [3] for the DL-reference UL/DL configuration of the serving cell. Otherwise, MDL_HARQ is the maximum number of DL HARQ processes as defined in section 7 of [3].

Mlimit is a constant equal to 8.

Denoting by E the rate matching output sequence length for the r-th coded block, and rvidx the redundancy version number for this transmission (rvidx=0, 1, 2 or 3), the rate matching output bit sequence is ek, k=0, 1, . . . , E-1.

The parameter 'ue-Category-v10xy' has been referred to as 'ue-Category-v1020' in the latest standards documents, and is a parameter indicating the category of User Equipment involved.

Figures 4, 5, 6:
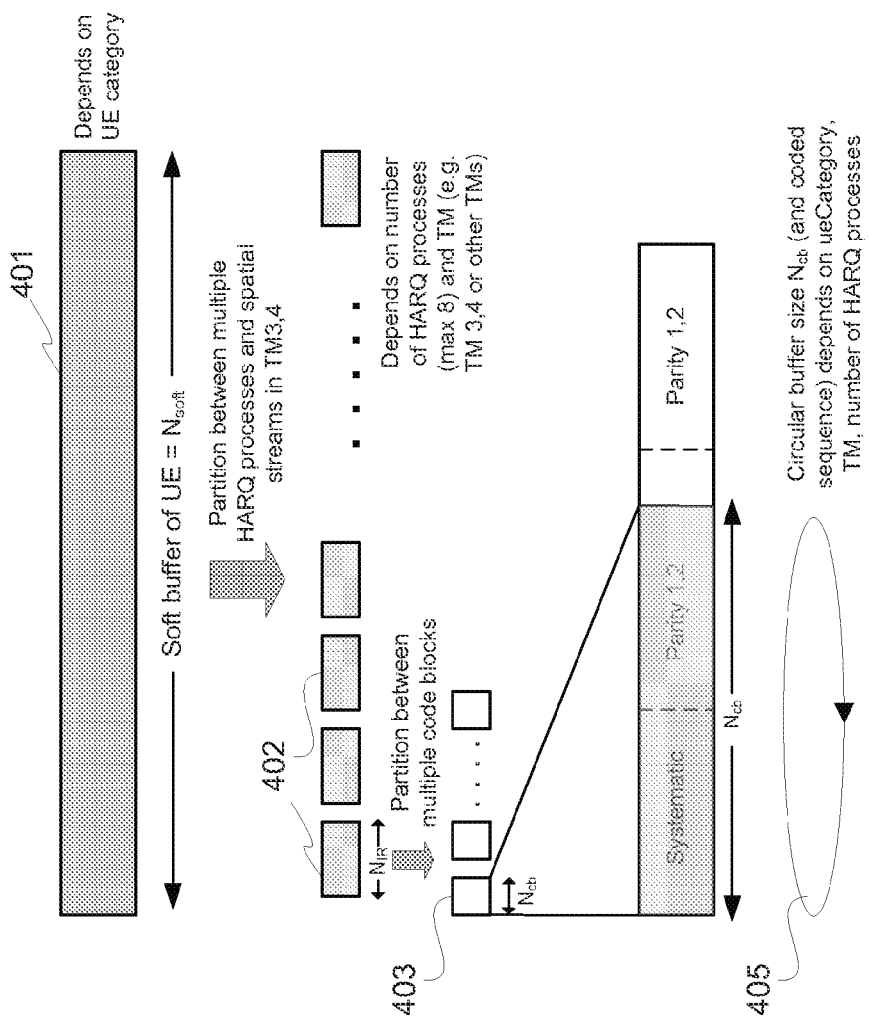
FIG. 4 is block diagram showing how determination of soft buffer size for the transport block and the soft buffer size for the code block may be carried out according to various embodiments.
FIG. 5 is a table showing a per PRB pair and per interfering layer assignment of the modulations that may be broadcasted in the DCI transmitted in the common or UE-specific search space according to various embodiments.
FIG. 6 is a table showing an exemplary indication to a UE for each modulation scheme using PRBs sets according to various embodiments.

For convenience, FIG. 4 illustrates soft buffer partitioning for circular buffer size determination according to embodiments. In particular, this figure illustrates determination of soft buffer size for the transport block and the soft buffer size for the code block according various to embodiments. In accordance to the embodiment shown in FIG. 4, the soft buffer 401 of size Nsoft is divided into multiple memory chunks 402 of size NIR for the transport blocks, where each memory chunk 402 corresponds to one HARQ process and one codeword (i.e. spatial stream), which may be related to the Transmission Mode (TM) in use at the time. Each memory chunk 402 of size NIR is further subdivided into multiple code blocks 403 of size NCB, where NCB is derived based on the equations above. The encoding procedure at the eNB may be performed by generating a coded sequence of convolutional turbo code (CTC), which may be comprised from systematic and parity bits, where parity bits from the first and second component code may be denoted as "Parity 1" and "Parity 2" in FIG. 4. The actual coded sequence sent by the eNB to the UE may be derived from coded sequence of CTC by reading the encoded sequence from the circular buffer 405 of size NCB, starting from the position determined by the redundancy version number rvidx. When the index of the coded sequence reaches the end of the circular buffer 405 of size NCB, the reading of the coded sequence starts again from the beginning of the circular buffer. A similar (i.e. complimentary, so it keeps in synchronization) buffer management process may be performed at the UE side for storing of the received bits for the subsequent decoding.

According to various embodiments, it can be seen that the coded bit sequence to be sent to a respective victim UE may depend on the parameters used in the respective coding procedure, for example the parameters: Nsoft signaled in UE Category (e.g. ue-Category-v10xy, ue-Category-v1020 or ue-Category); User Equipment (UE) capability of supporting two spatial layers for the DownLink (DL) cell; Number of Hybrid Automatic Repeat request (HARQ) processes; Number of configured cells in Carrier Aggregation (CA). This is to say, the victim UE may receive information about HARQ soft buffer partition by configuration of one or more coding parameter sets which may include the parameters: a parameter that defines a UE category, a parameter that defines a UE capability of supporting at least two spatial layers for the DL cell, a parameter that defines a number of HARQ processes, and a parameter that defines a number of component carriers (CCs). As these parameters are UE-specific, some ambiguity may occur at the victim UE for the decoding of interfering signals. Therefore, different solutions to this problem are provided in different embodiments.

One embodiment may comprise indicating to the victim UE information about HARQ soft buffer partition by configuration of one or multiple sets which includes the coding parameters {ue-Category-v10xy, UE capability of supporting two spatial layers for the DL cell, Number of HARQ processes, number of CCs} by the Radio Resource Control (RRC), where ue-Category-v10xy (e.g. ue-Category-v1020) parameter indicates Nsoft value that should be assumed by the UE as being used to encode the encoded sequence of the respective interfering layer. Then by means of DCI signaling, embodiments may dynamically indicate the particular set that should be used for the decoding of the interfering layer. In the case of there only being a single set configuration, the DCI based selection signaling may not be used.

In another embodiment, it may be assumed at the victim UE the same {ue-Category-v10xy (e.g. ue-Category-v1020), UE capability of supporting two spatial layers for the DL cell, Number of HARQ processes, number of CCs} parameters as the ones which are used for the decoding of the serving signal (i.e. main signal intended to be received) are applicable to the interfering signals/layers as well.

Another embodiment may configure default values for the coding parameters {ue-Category-v10xy (e.g. ue-Category-v1020), UE capability of supporting two spatial layers for the DL cell, Number of HARQ processes, number of CCs} which should be used for the decoding of the serving and/or interfering layers. In such embodiments, the configured parameters {ue-Category-v10xy (e.g. ue-Category-v1020), UE capability of supporting two spatial layers for the DL cell, Number of HARQ processes} should not exceed current (victim) UE capability.

In an example embodiment which makes use of a ML receiver or Symbol level IC receiver for receiving the PDSCH, in order to improve the interference suppression/cancellation performance, the ML receiver should be capable of processing more spatial layers than there are number of receiver antennas. Indeed, this may also be applicable to any L-CWIC or ML-CWIC receiver based implementations. For example, a victim UE with two antennas should be able to process three or larger number of (i.e. three or more) spatial layers using the maximum likelihood criterion. For a UE with maximum three layers processing capabilities, the layer partition between serving and interfering nodes can be, for example, as follows:
 {Number of serving layer 1, Number of interfering layers 0, 1 or 2}
 {Number of serving layers 2, Number of interfering layers 0 or 1}

In such an example embodiment using a ML receiver or SIC receiver, in order to support such receivers in use (i.e. capable of processing larger number of streams than there are receiver antennas), at least two modulation schemes corresponding to up to two interfering layers should be signaled to the victim UE. The indicated modulation could be, for example, {Spare, QPSK, 16QAM, 64QAM}, where 'Sparse' may indicate an empty Physical Resource Blocks (PRB) pair, 'QPSK' is Quadrature Phase Shift Keying, '16QAM' is 16-point quantized Quadrature Amplitude Modulation, and '64QAM' is 64-point quantized Quadrature Amplitude Modulation. As described above, the per PRB pair and per layer assignment of the modulations can be broadcasted in the DCI message transmitted in the common or UE-specific search space.

An example embodiment of the data transmitted in this example embodiment using a ML receiver or SIC receiver is as shown in the Table of FIG. 5. Modulation assignment may be also signaled for the PRB sets comprising a plurality of adjacent PRBs pairs.

Another example embodiment of the data transmitted in this example embodiment using a ML receiver or SIC receiver is as shown in the Table of FIG. 6, where, for each modulation, the PRBs set can be indicated to the UE, where 'PRB set' is a bitmap, where ones (or zeros) in the bitmap indicates that particular PRB on the particular layer carriers of the PDSCH with indicated modulation.

Similar signaling may be defined for a Precoding Matrix Indicator (PMI) on interfering cell(s), where the PMI of different ranks (or rank-2 and above only) are provided to the victim UE per each PRB or PRG (precoding resource group).

In another embodiment, the power boosting of PDSCH relative to Cell specific Reference Signals (CRS) is signaled per each PRB or per PRB set from the set [−6, −4.77, −3, −1.77, 0, 1, 2, 3] dB.

In some further embodiments (that may also include some or all aspects of the previous example embodiments), reference signals enhancements made be provided. In these example embodiments, to facilitate measurement of the channel (i.e. to provide accurate channel estimation from more than two spatial layers, e.g. the serving and interfering signals), the victim UE-specific Reference Signal (RS) should support up to four orthogonal antenna ports for serving and interfering signals. By assigning different orthogonal antenna ports to serving and interfering signals the contribution from interfering or serving UE-specific RS can be cancelled (removed) during channel estimation of interfering and serving channel respectively.

In a first RS embodiment, antenna ports 7, 8 and 11, 13 (e.g. with orthogonal cover codes (OCC) length 4 processing) may be used for scheduling of the, for example, PDSCH transmissions with up to two layers for serving and interfering signals with orthogonal UE-specific RS antenna ports. The examples of the legacy (i.e. conventional) and new {Antenna port(s), scrambling identity and number of layers indication} mapping tables in accordance to this embodiment are shown in FIGS. 7 and 8 respectively, where the new table is obtained by replacing antenna ports 7, 8 in the legacy table with antenna port 11, 13 when 1 or 2 layers are used. The indication of which UE-specific antenna ports are used for the PDSCH may be signaled with help of an additional bit in, for example, DCI format 2C/2D (or other formats, which may, or may not be based on DCI format 2C/2D). This additional bit may be used to switch between legacy and new {Antenna port(s), scrambling identity and number of layers indication} mapping tables (see FIGS. 7 and 8). In another embodiment, RRC signaling may be used instead to switch between the tables, in which case DCI based selection may not be required.

In an alternative RS embodiment, the 4 orthogonal antenna ports of UE-specific RS for PDSCH may be achieved by using UE-specific RS antenna ports 7, 8 and 9, 10 (e.g. with OCC length 2 processing and frequency division multiplexing) on serving and interfering signals. The examples of the legacy and new {Antenna port(s), scrambling identity and number of layers indication} mapping tables in accordance to this embodiment are shown in FIGS. 7 and 9, where the new table is obtained by replacing antenna ports 7, 8 in the legacy table with antenna port 9, 10 when 1 or 2 layers are used.

In another alternative RS embodiment, a new DCI format (e.g. DCI format 2E) may be used for interference cancellation (IC). For example, the tables of FIGS. 7 and 9 may be merged into a single table, which uses 4 bits to determine antenna ports used for transmission of the serving or interfering PDSCH signals—see FIG. 10.

In some embodiments, it may be assumed that interference cancellation can be configured only for PDSCH transmission with not more than 4 layers, in which case the entries in FIGS. 7 and 9 corresponding to PDSCH transmission with not more than 4 layers may be merged into a single {Antenna port(s), scrambling identity and number of layers indication} mapping table, which uses 3 bits to determine antenna ports used for transmission of the serving or interfering PDSCH signals—see FIG. 11. In this case, there may be no need to newly define or change the existing DCI format. Moreover, for such an example embodiment, the, for example, PDSCH Resource Elements (REs) mapping may be performed either assuming antenna ports 7, 8 or antenna ports 9, 10 or antenna ports 7, 8, 9, 10 depending on the additional configuration signaled from the network.

In some embodiments, UE-specific antenna ports 11, 13, 12 and 14 may be used for PDSCH transmission on the first four layers. The example of {Antenna port(s), scrambling identity and number of layers indication} mapping table in accordance to this embodiment is shown in FIG. 12, where the new table is obtained by replacing antenna ports 7, 8, 9 and 10 in the legacy table with antenna port 11, 13, 12 and 14.

In a further alternative RS embodiment, by using RRC signaling the network may configure one table out of two available (e.g. FIGS. 7 (legacy) and 12 (new)) that should be used by the UE for antenna port, scrambling identity and layers indication.

In some further embodiments (that may also include some or all aspects of the previous example embodiments), PRB bundling for interfering channels may be used. This is to say, in order to improve channel estimation performance for UE-specific reference signals on interfering layers, the PRB bundling assumption for interfering layer(s) may be configured for the UE using RRC signaling. If PRB bundling is configured on the interfering cell, the victim UE may assume the same precoding vector across the set of the adjacent PRBs in the interfering signal.

In some further embodiments (that may also include some or all aspects of the previous example embodiments), signaling of PDSCH RE mapping may be used. In such situations, for most receivers (but especially CWIC receivers), it may be desirable to signal the PDSCH REs mapping used on the interfering signals/layers. In this case the network may configure for the victim UE (e.g. using RRC signaling) one or more sets of information that includes the following parameters: {PDSCH start, zero power channel state information reference signals (ZP CSI-RS), non-zero power channel state information reference signals (NZP CSI-RS), MBSFN subframes (Multicast Broadcast Single Frequency Network), CRS configuration (Cell ID and CRS antenna ports)}. The particular set used by interfering node(s) for PDSCH transmission may then be signaled, for example, in DCI using IPQI bits (i.e. interfering PDSCH RE mapping and Quasi co-location signaling bits). In another embodiment, only a subset of the parameters, for example, the ZP CSI-RS, NZP CSI-RS, MBSFN subframes, and CRS configuration parameters corresponding to interfering cell(s) may be provided, for example using RRC signaling. In another embodiment only one set of the parameters {PDSCH start, ZP CSI-RS, NZP CSI-RS, MBSFN subframes, CRS configuration} corresponding to interfering cell may be configured to the UE. Signaling of these additional coding parameters of the interfering signal to the UE experiencing the respective interference (i.e. victim UE) will further aid the decoding of the interfering signal, and hence aid the cancellation/suppression of the respective interfering signal in the interference cancellation and suppression receiver in use in the victim UE.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, as a FPGA, or an ASIC, which together constitute embodiment of processing circuitry configured or configurable to perform the functions of the above examples and embodiments. Any such hardware can also take the form of a chip or chip set arranged to operate according to any one or more of the above described diagrams, such diagrams and associated descriptions being taken jointly or severally in any and all permutations.

Figure 13:
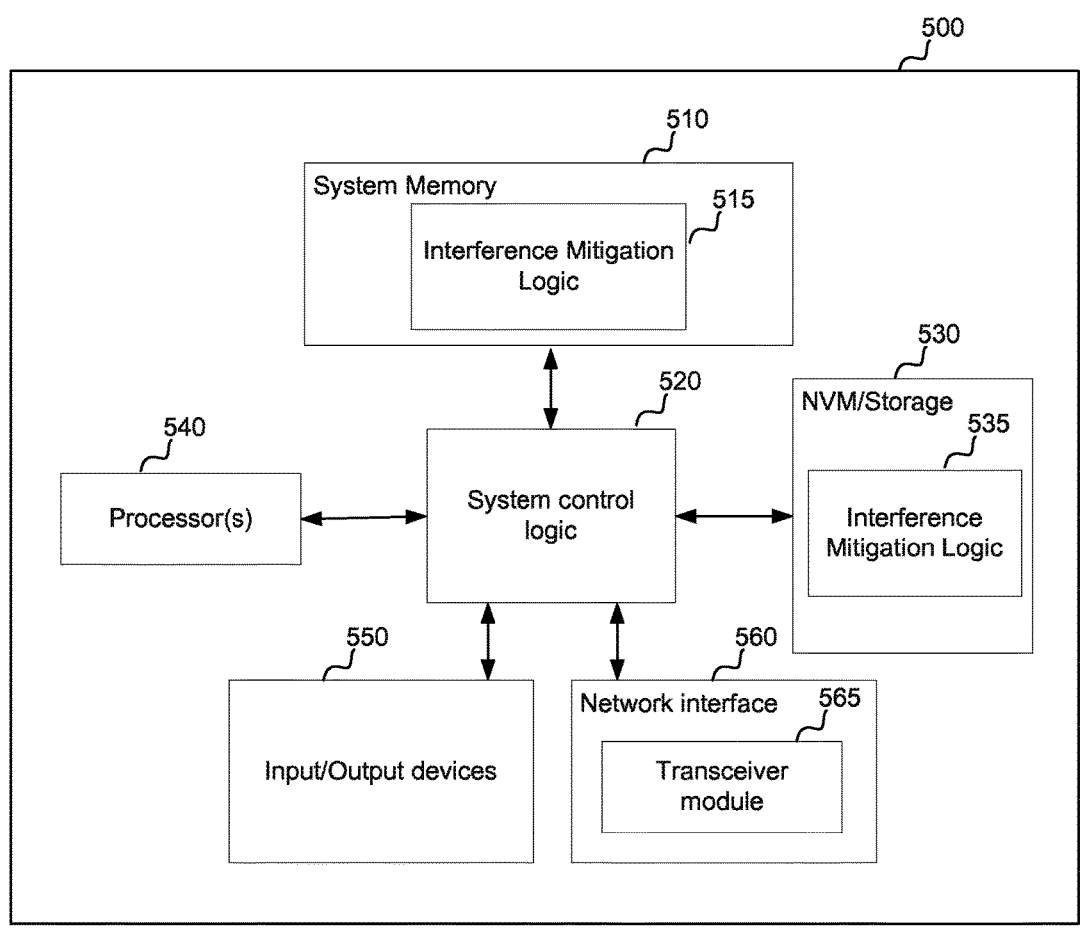
FIG. 13 is a block diagram showing an example system in accordance with various embodiments.

The eNBs 102, 110 and UEs (104, 106, 108) described herein may be implemented into a system using any suitable hardware and/or software to configure as desired. FIG. 13 illustrates, for one embodiment, an example system 500 comprising one or more processor(s) 540, system control logic 520 coupled with at least one of the processor(s) 540, system memory 510 coupled with system control logic 520, non-volatile memory (NVM)/storage 530 coupled with system control logic 520, and a network interface 560 coupled with system control logic 520. The system control logic 520 may also be coupled to Input/Output devices 550.

Processor(s) 540 may include one or more single-core or multi-core processors. Processor(s) 540 may include any combination of general-purpose processors and dedicated processors (e.g., graphics processors, application processors, baseband processors, etc.). Processors 540 may be operable to carry out the above described methods, using suitable instructions or programs (i.e. operate via use of processor, or other logic, instructions). The instructions may be stored in system memory 510, as interference mitigation logic memory portion 515, or additionally or alternatively may be stored in (NVM)/storage 530, as NVM interference mitigation logic instruction portion 535.

Processors(s) 540 may be configured to execute the embodiments of FIGS. 2-3 in accordance with various embodiments. In an embodiment in which the system 500 implements eNB 102, processor(s) 540 may be configured to transmit to the UE 102 interfering signal characteristics information 112, for example including the interfering signal coding parameters herein described.

System control logic 520 for one embodiment may include any suitable interface controllers to provide for any suitable interface to at least one of the processor(s) 540 and/or to any suitable device or component in communication with system control logic 520.

System control logic 520 for one embodiment may include one or more memory controller(s) (not shown) to provide an interface to system memory 510. System memory 510 may be used to load and store data and/or instructions, for example, for system 500. System memory 510 for one embodiment may include any suitable volatile memory, such as suitable dynamic random access memory (DRAM), for example.

NVM/storage 530 may include one or more tangible, non-transitory computer-readable media used to store data and/or instructions, for example. NVM/storage 530 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 530 may include a storage resource physically part of a device on which the system 500 is installed or it may be accessible by, but not necessarily a part of, the device. For example, the NVM/storage 530 may be accessed over a network via the network interface 560.

System memory 510 and NVM/storage 530 may respectively include, in particular, temporal and persistent copies of, for example, the instructions memory portions holding the interference mitigation logic 515 and 535, respectively. Interference mitigation logic instructions portions 515 and 535 may include instructions that when executed by at least one of the processor(s) 540 result in the system 500 implementing a one or both of methods 200 and/or 300, or the method(s) of any other embodiment, as described herein. In some embodiments, instruction portions 515 and 535, or hardware, firmware, and/or software components thereof, may additionally/alternatively be located in the system control logic 520, the network interface 560, and/or the processor(s) 540.

Network interface 560 may have a transceiver module 565 to provide a radio interface for system 500 to communicate over one or more network(s) (e.g. wireless communication network) and/or with any other suitable device. In various embodiments, the transceiver 565 may be integrated with other components of system 500. For example, the transceiver 565 may include a processor of the processor(s) 540, memory of the system memory 510, and NVM/Storage of NVM/Storage 530. Network interface 560 may include any suitable hardware and/or firmware. Network interface 560 may be operatively coupled to a plurality of antennas to provide a multiple input, multiple output radio interface. Network interface 560 for one embodiment may include, for example, a network adapter, a wireless network adapter, a telephone modem, and/or a wireless modem.

For one embodiment, at least one of the processor(s) 540 may be packaged together with logic for one or more controller(s) of system control logic 520. For one embodiment, at least one of the processor(s) 540 may be packaged together with logic for one or more controllers of system control logic 520 to form a System in Package (SiP). For one embodiment, at least one of the processor(s) 540 may be integrated on the same die with logic for one or more controller(s) of system control logic 520. For one embodiment, at least one of the processor(s) 540 may be integrated on the same die with logic for one or more controller(s) of system control logic 520 to form a System on Chip (SoC).

In various embodiments, the I/O devices 550 may include user interfaces designed to enable user interaction with the system 500, peripheral component interfaces designed to enable peripheral component interaction with the system 500, and/or sensors designed to determine environmental conditions and/or location information related to the system 500.

Figure 14:
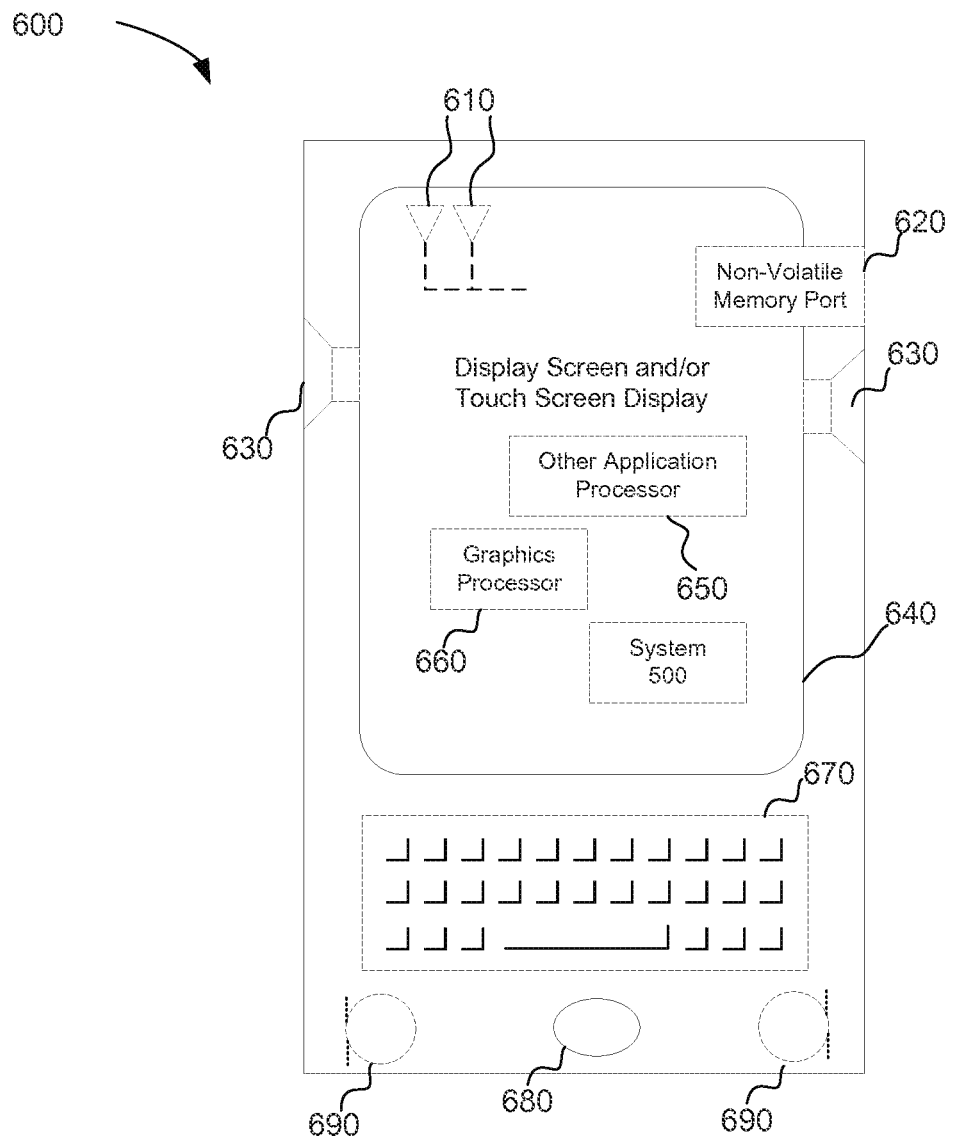
FIG. 14 is a block diagram showing an example wireless apparatus configured for communicating in a wireless network according to one or more of the inventive methods disclosed herein.

FIG. 14 shows an embodiment in which the system 500 implements a UE 104, 106, 108 in the specific form of a mobile device 600.

In various embodiments, user interfaces could include, but are not limited to, a display 640 (e.g., a liquid crystal display, a touch screen display, etc.), a speaker 630, a microphone 690, one or more cameras 680 (e.g., a still camera and/or a video camera), a flashlight (e.g., a light emitting diode flash), and a keyboard 670.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 560 to communicate with components of a positioning network, e.g., a global positioning system (GPS) satellite.

In various embodiments, the system 500 may be a mobile computing device such as, but not limited to, a laptop computing device, a tablet computing device, a netbook, a mobile phone, etc. In various embodiments, system 500 may have more or less components, and/or different architectures.

In various embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

In various embodiments, a method of mitigating interference on the Physical Downlink Shared Channel (PDSCH) at a user equipment in a wireless communication system is provided, wherein the user equipment comprises an interference cancellation receiver for receiving on the PDSCH, the method comprising receiving, at the user equipment, the PDSCH in the presence of at least one interfering signal, obtaining, at the user equipment, information defining parameters used in a coding procedure used to encode the at least one interfering signal, and suppressing interference caused by the at least one interfering signal when receiving the PDSCH based on the obtained information by decoding the at least one interfering signal using the parameters defined by the obtained information and using the decoded at least one interfering signal for interference cancellation.

In various embodiments, wherein obtaining, at the user equipment, information defining parameters used in a coding procedure used to encode the at least one interfering signal comprises receiving information, at the user equipment, about HARQ soft buffer partition by configuration of one or more parameter sets which includes the parameters: a parameter that defines a UE category, a parameter that defines a UE capability of supporting at least two spatial layers for the DL cell, a parameter that defines a number of HARQ processes, a parameter that defines a number of component carriers (CCs), and receiving an indication of which of the one or more parameter sets to use for the decoding of the at least one interfering signal; OR assuming, at the user equipment, a same set of parameters: a parameter that defines a UE category, a parameter that defines a UE capability of supporting at least two spatial layers for the DL cell, a parameter that defines a number of HARQ processes, a parameter that defines a number of CCs, which are used for the decoding of the serving signal are applicable to the at least one interfering signal as well; OR receiving and using default values for the parameters: a parameter that defines a UE category, a parameter that defines a UE capability of supporting at least two spatial layers for the DL cell, a parameter that defines a number of HARQ processes, a parameter that defines a number of CCs, for the decoding of the serving and the at least one interfering signal.

In various embodiments, wherein the interference cancellation receiver comprises an interference cancellation and suppression receiver, and wherein obtaining, at the user equipment, information defining parameters used in a coding procedure used to encode the at least one interfering signal further comprises receiving at least two modulation schemes corresponding to at least two interfering signals by signaling.

In various embodiments, wherein the at least two modulation schemes includes: Spare, QPSK, 16QAM, and/or 64QAM, and wherein Spare indicates an empty physical resource blocks, PRB, pair.

In various embodiments, the method(s) may further comprises broadcasting to the user equipment in a DCI transmission in a UE-specific or common search space, a per PRB pair and per layer assignment of the at least two modulations to use.

In various embodiments, wherein there are a plurality of PRB sets and wherein a modulation assignment signaling includes signaling for the PRB sets comprising a plurality of adjacent PRB pairs.

In various embodiments, wherein receiving at least two modulation schemes corresponding to at least two interfering layers by signaling comprises receiving an indication of each modulation scheme by means of a bitmap, wherein particular binary '1' values in the bitmap indicates that particular PRB on the particular layer carriers PDSCH with an indicated modulation.

In various embodiments, wherein receiving at least two modulation schemes corresponding to at least two interfering layers by signaling comprises receiving signaling defined for a Precoding Matrix Indicator (PMI) on interfering cell(s), wherein the PMI of different ranks (or rank-2 and above only) are provided to the user equipment per each PRB or precoding resource group (PRG).

In various embodiments, the described method(s) may further comprise power boosting of the PDSCH relative to the cell specific reference signals (CRS), as signaled per each PRB.

In various embodiments, wherein the power boosting of the PDSCH is signaled per each PRB from a set [−6, −4.77, −3, −1.77, 0, 1, 2, 3] dB.

In various embodiments, the described method(s) may further comprise providing a capability to process more spatial layers at the UE than a number of antennas in use on the UE, wherein a spatial layer comprises a received data stream.

In various embodiments, wherein a received data stream comprises a serving data stream or an interfering data stream.

In various embodiments, wherein a serving data stream is a data stream intended to be received at the user equipment, and an interfering data stream is a data stream unintentionally received at the user equipment and which interferes with a reception of the serving data stream.

In various embodiments, wherein there are at least two spatial layers received at the user equipment, wherein a spatial layer comprises either a serving signal or interfering signal, and wherein the signaling comprises an indication of which UE-specific antenna ports to be used for the interfering PDSCH using an additional bit in a DCI format.

In various embodiments, wherein UE-specific RS may use: antenna ports 11, 13 for the PDSCH transmission with 1 or 2 spatial layers or antenna ports 9, 10 for the PDSCH transmission with 1 or 2 spatial layers.

In various embodiments, wherein a DCI bit or RRC signaling is used between a new {antenna port(s), scrambling identity and number of layers} mapping table and a legacy {antenna port(s), scrambling identity and number of layers} mapping table to determine antenna ports used for PDSCH transmission.

In various embodiments, wherein the DCI format comprises DCI format 2E and 4 bits are used to determine antenna port(s), scrambling identity and number of layers in use.

In various embodiments, wherein a mapping table is used by the user equipment for determination of antenna port, scrambling identity and layers used for PDSCH transmission.

In various embodiments, the described method(s) may further comprise improving channel estimation performance for UE-specific reference signals on an interfering signal by configuring the PRB bundling assumption for the interfering signals using RRC signaling.

In various embodiments, the described method(s) may further comprise receiving signaling of a PDSCH REs mapping used on the interfering signals, wherein the signaling includes further configuration information for the user equipment, the further configuration information including one or more sets of data that includes the following parameters: {PDSCH start, ZP CSI-RS, NZP CSI-RS, MBSFN subframes, CRS configuration}, where CRS configuration includes number of CRS antenna ports and Cell ID.

In various embodiments, wherein the signaling PDSCH REs mapping comprising signaling using Interfering PDSCH RE mapping and Quasi co-location signaling, IPQI, bits in the DCI transmission.

In various embodiments, an apparatus for use in a wireless communication system is provided, the apparatus comprising processing circuitry to receive the PDSCH in the presence of at least one interfering signal, obtain information defining parameters used in a coding procedure used to encode the at least one interfering signal, and suppress interference caused by the at least one interfering signal when receiving the PDSCH based on the obtained information by decoding the at least one interfering signal using the parameters defined by the obtained information and using the decoded at least one interfering signal for interference cancellation.

In various embodiments, the circuitry may be further configured to receive information about HARQ soft buffer partition by configuration of one or more parameter sets which includes the parameters: a parameter that defines a UE category, a parameter that defines a UE capability of supporting at least two spatial layers for the DL cell, a parameter that defines a number of HARQ processes, a parameter that defines a number of component carriers (CCs), and receive an indication of which of the one or more parameter sets to use for the decoding of the at least one interfering signal; OR assume a same set of parameters: a parameter that defines a UE category, a parameter that defines a UE capability of supporting at least two spatial layers for the DL cell, a parameter that defines a number of HARQ processes, and a parameter that defines a number of CCs, which are used for the decoding of the serving signal are applicable to the at least one interfering signal as well; OR receive and using default values for the parameters: a parameter that defines a UE category, a parameter that defines a UE capability of supporting at least two spatial layers for the DL cell, a parameter that defines a number of HARQ processes, a parameter that defines a number of CCs, for the decoding of the serving and the at least one interfering signal.

In various embodiments, the apparatus may further comprise an interference cancellation receiver, and wherein the circuitry may be further configured to obtain information defining parameters used in a coding procedure used to encode the at least one interfering signal is further configured to receive at least two modulation schemes corresponding to at least two interfering signals by signaling.

In various embodiments, wherein the circuitry may be further configured to process more spatial layers at the UE than a number of antennas in use on the UE, wherein a spatial layer comprises a received data stream.

In various embodiments, wherein the circuitry may be configured to receive at least two spatial layers, wherein a spatial layer comprises either a serving signal or interfering signal, and wherein the circuitry is further configured to signal an indication of which UE-specific antenna ports to be used for the interfering PDSCH using an additional bit in a DCI format.

In various embodiments, wherein a UE-specific RS may be configured to use antenna ports 11, 13 for the PDSCH transmission with 1 or 2 spatial layers, or antenna ports 9, 10 for the PDSCH transmission with 1 or 2 spatial layers.

In various embodiments, wherein the circuitry may be configured to use a mapping table for determination of antenna port, scrambling identity and layers used for PDSCH transmission.

In various embodiments, wherein the circuitry may be further configured to signal a PDSCH REs mapping used on the interfering signals, wherein the signal includes further configuration information for the user equipment, the further configuration information including one or more sets of data that includes the following parameters: {PDSCH start, ZP CSI-RS, NZP CSI-RS, MBSFN subframes, CRS configuration}, where CRS configuration includes number of CRS antenna ports and Cell ID.

In various embodiments, wherein the signaling PDSCH REs mapping may comprise signaling using Interfering PDSCH RE mapping and Quasi co-location signaling, IPQI, bits in the DCI transmission.

In various embodiments, the may be provided a circuit for use in an eNodeB in a wireless communication system, the circuit comprising means for transmitting a first downlink signal to a first user equipment, means for identifying other signals in the wireless communication system that are expected to interfere with the first downlink signal transmitted to the first user equipment, and means for transmitting to the first user equipment information defining parameters used in a coding procedure used to encode the other signals in the wireless communication system that are expected to interfere with the first downlink signal transmitted to the first user equipment.

In various embodiments, a non-transient computer readable medium may be provided comprising computer program instructions that when executed on a processor cause any herein described method to be performed.

In various embodiments, a user equipment may be provided comprising the any herein described apparatus, and may for example further comprise one or more of: a screen, a speaker, a touchscreen, a keyboard, an antenna array including a plurality of antennas, a graphics processor, or an application processor.

The invention claimed is:

1. A method of mitigating interference on a Physical Downlink Shared Channel (PDSCH) at a user equipment (UE) in a wireless communication system, the UE comprising an interference cancellation receiver and the method comprising:
   receiving, at the UE, downlink control information (DCI), the DCI comprising a bit for specifying to the UE at least one antenna on the UE for receiving an interfering signal;
   receiving, at the UE, the PDSCH and the interfering signal, wherein the interfering signal interferes with receiving the PDSCH at the UE;
   obtaining, at the UE, information defining parameters used in a coding procedure used to encode the interfering signal; and
   suppressing interference caused by the interfering signal when the UE is receiving the PDSCH based on the obtained information by decoding the interfering signal using the parameters defined by the obtained information and using the decoded interfering signal for interference cancellation.

2. The method of claim 1, wherein obtaining, at the UE, information defining parameters used in a coding procedure used to encode the interfering signal comprises:
   receiving information, at the UE, about Hybrid Automatic Repeat Request (HARQ) soft buffer partition by configuration of one or more first parameter sets comprising:
     a parameter that defines a UE category,
     a parameter that defines a UE capability of supporting at least two spatial layers for a downlink (DL) cell,
     a parameter that defines a number of HARQ processes, or
     a parameter that defines a number of component carriers (CCs); and receiving an indication of which of the one or more first parameter sets to use for the decoding of the interfering signal; or assuming, at the UE, a second set of parameters, the second set of parameters comprising:
 a parameter that defines a UE category,
 a parameter that defines a UE capability of supporting at least two spatial layers for a DL cell,
 a parameter that defines a number of HARQ processes, or
 a parameter that defines a number of CCs, wherein the second set of parameters is for decoding a serving signal; or receiving and using default values for a third set of parameters, the third set of parameters comprising:
 a parameter that defines a UE category,
 a parameter that defines a UE capability of supporting at least two spatial layers for the DL cell,
 a parameter that defines a number of HARQ processes, or
 a parameter that defines a number of CCs, wherein the third set of parameters is for decoding one or more of a serving signal and the interfering signal.

3. The method of claim 1, further comprising receiving another interfering signal that interferes with receiving the PDSCH at the UE, wherein the interference cancellation receiver comprises an interference cancellation and suppression receiver, and wherein obtaining, at the UE, information defining parameters used in a coding procedure used to encode the interfering signal further comprises:
 receiving at least two modulation schemes corresponding to the two interfering signals by signaling.

4. The method of claim 3, further comprising receiving, at the UE, a plurality of spatial layers, wherein a spatial layer of the plurality of spatial layers comprises either a serving signal or interfering signal.

5. The method of claim 4, wherein, for PDSCH transmission with a plurality of spatial layers, a UE-specific reference signal (RS) assigns one or more of the following UE-specific antenna ports:
 antenna ports 9, 10, 11, and 13.

6. The method of claim 5, wherein at least one DCI bit or radio resource control (RRC) signaling is used between a new {antenna port(s), scrambling identity and number of layers} mapping table and a legacy {antenna port(s), scrambling identity and number of layers} mapping table to determine at least one of the UE-specific antenna ports for the PDSCH transmission.

7. The method of claim 6, wherein a DCI format comprises DCI format 2E and wherein 4 bits are used to determine the at least one of the UE-specific antenna ports, scrambling identity, and number of layers in use.

8. The method of claim 1, further comprising receiving, at the UE, a UE-specific reference signal (RS), the UE-specific reference signal specifying to the UE that the UE can process more spatial layers than a number of antennas in use on the UE, wherein a spatial layer comprises a received data stream.

9. The method of claim 8, wherein a received data stream comprises a serving data stream or an interfering data stream.

10. The method of claim 9, wherein a serving data stream is a data stream intended to be received at the UE, and an interfering data stream is a data stream unintentionally received at the UE and which interferes with a reception of the serving data stream.

11. The method of claim 1, further comprising determining one or more antenna ports, one or more scrambling identities, and one or more layers used for PDSCH transmission, wherein a mapping table is used by the UE for the determination.

12. The method of claim 1, further comprising improving channel estimation performance for UE-specific reference signals on the interfering signal by configuring a physical resource block (PRB) bundling assumption for the interfering signal using radio resource control (RRC) signaling.

13. The method of claim 1, further comprising receiving signaling of a PDSCH resource element (RE) mapping used on the interfering signal, wherein the signaling includes further configuration information for the UE, the further configuration information including one or more sets of data comprising a plurality of parameters, the plurality comprising:
 {PDSCH start, zero power channel state information reference signals (ZP CSI-RS), non-zero power channel state information reference signals (NZP CSI-RS), Multicast Broadcast Single Frequency Network (MB-SFN) subframes), cell specific reference signal (CRS) configuration}, wherein CRS configuration includes a number of CRS antenna ports and Cell identifier.

14. The method of claim 13, wherein the signaling of the PDSCH RE mapping comprising signaling using Interfering PDSCH RE mapping and Quasi co-location signaling bits in downlink control information (DCI) transmission.

15. A non-transitory computer readable medium comprising one or more instructions, the one or more instructions comprising instructions for mitigation of interference on a Physical Downlink Shared Channel (PDSCH) at a user equipment (UE) in a wireless communication system, the UE comprising an interference cancellation receiver and one or more processors configured to execute the instructions for the mitigation to:
 receive downlink control information (DCI), the DCI comprising a bit for specifying to the UE at least one antenna coupled to the UE for receiving an encoded interfering signal;
 receive the PDSCH and the encoded interfering signal, wherein the encoded interfering signal interferes with reception of the PDSCH by the UE;
 obtain characteristics information about the encoded interfering signal;
 derive encoding parameters of the encoded interfering signal from the obtained characteristics information; and
 cancel interference caused by the encoded interfering signal when receiving the PDSCH by using the derived encoding parameters to decode the interfering signal and using the decoded interfering signal in an interference cancellation procedure.

16. The non-transitory computer readable medium of claim 15, wherein the one or more processors are further configured to execute the instructions for the mitigation to:
 derive encoding parameters of the encoded interfering signal from the obtained characteristics information by obtaining information about Hybrid Automatic Repeat Request (HARQ) soft buffer partition configuration according to one or more parameter sets which includes a first set of parameters, the first set of parameters comprising:
 a parameter that defines a UE category,
 a parameter that defines a UE capability of supporting at least two spatial layers for a downlink (DL) cell, a parameter that defines a number of HARQ processes, or a parameter that defines a number of component carriers (CCs); and receive an indication of which of the one or more parameter sets to use for the decoding of the interfering signal; or derive encoding parameters of the encoded interfering signal from the obtained characteristics information by assuming a second set of encoding parameters are applicable to the encoded interfering signal, the second set of parameters comprising:

a parameter that defines a UE category, a parameter that defines a UE capability of supporting at least two spatial layers for a DL cell, a parameter that defines a number of HARQ processes, or a parameter that defines a number of CCs; or derive encoding parameters of the encoded interfering signal from the obtained characteristics information by using default values for the encoding parameters, wherein the encoding parameters include:

a default value for a parameter that defines a UE category, a default value for a parameter that defines a UE capability of supporting at least two spatial layers for a DL cell, a default value for a parameter that defines a number of HARQ processes, or a default value for a parameter that defines a number of CCs.

17. The non-transitory computer readable medium of claim 15, wherein the one or more processors are further configured to execute the instructions for the mitigation to:

obtain characteristics information about another interfering signal that interferes with receiving the PDSCH at the UE; and derive encoding parameters of the two encoded interfering signals from the obtained characteristics information, wherein the one or more processors being configured to execute the instructions for the mitigation to derive the encoding parameters of the two encoded interfering signals from the obtained characteristics information comprises the one or more processors being configured to execute the instructions for the mitigation to receive at least two modulation schemes corresponding to the two interfering signals by signaling.

18. A circuit for use in an evolved node base station (eNodeB) in a wireless communication system, the circuit comprising:

means for transmitting a first signal to a user equipment (UE), the first signal to include downlink control information (DCI), the DCI comprising a bit specifying at least one antenna on the UE for receiving a second signal expected to interfere with the first signal transmitted to the UE;

means for identifying the second signal in the wireless communication system; and means for transmitting, to the UE, information defining parameters used in a coding procedure used to encode the second signal.

19. A circuit for use in a user equipment (UE) in a wireless communication system, the circuit comprising:

means for receiving downlink control information (DCI), the DCI comprising a bit for specifying to the UE at least one antenna on the UE for receiving an interfering signal;

means for receiving a Physical Downlink Shared Channel (PDSCH) and the interfering signal, wherein the interfering signal interferes with receiving the PDSCH at the UE;

means for obtaining information defining parameters used in a coding procedure used to encode the interfering signal; and means for suppressing interference caused by the interfering signal when the UE is receiving the PDSCH based on the obtained information by decoding the interfering signal using the parameters defined by the obtained information and using the decoded interfering signal for interference cancellation.

20. A user equipment (UE), comprising:

processing circuitry;

an antenna array including a plurality of antennas, the antenna array coupled to the processing circuitry; and at least one selected from a group consisting of: a screen, a speaker, a touchscreen, a keyboard, a graphics processor, and an application processor, wherein the processing circuitry is configured to:

receive downlink control information (DCI), the DCI comprising a bit for specifying to the UE at least one antenna on the UE for receiving an interfering signal;

receive a Physical Downlink Shared Channel (PDSCH) and the interfering signal, wherein the interfering signal interferes with receiving the PDSCH at the UE;

obtain information defining parameters used in a coding procedure used to encode the interfering signal; and suppress interference caused by the interfering signal when the UE is receiving the PDSCH based on the obtained information by decoding the interfering signal using the parameters defined by the obtained information and using the decoded interfering signal for interference cancellation.

* * * * *